US010615971B2

(12) United States Patent
Acar et al.

(10) Patent No.: US 10,615,971 B2
(45) Date of Patent: Apr. 7, 2020

(54) HIGH INTEGRITY LOGS FOR DISTRIBUTED SOFTWARE SERVICES

(71) Applicant: Microsoft Technology Licensing, LLC, Redmond, WA (US)

(72) Inventors: Tolga Acar, Sammamish, WA (US); Malcolm Erik Pearson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 15/601,518

(22) Filed: May 22, 2017

(65) Prior Publication Data

US 2018/0337772 A1 Nov. 22, 2018

(51) Int. Cl.
*H04L 9/08* (2006.01)
*H04L 9/32* (2006.01)
*H04L 29/06* (2006.01)
*G06F 21/64* (2013.01)
*G06F 21/60* (2013.01)

(52) U.S. Cl.
CPC ............ *H04L 9/083* (2013.01); *G06F 21/602* (2013.01); *G06F 21/64* (2013.01); *H04L 9/0869* (2013.01); *H04L 9/3242* (2013.01); *H04L 9/3247* (2013.01); *H04L 63/123* (2013.01); *H04L 2209/38* (2013.01)

(58) Field of Classification Search
CPC ..... H04L 9/083; H04L 9/0869; H04L 9/3242; H04L 9/3247; H04L 63/123
See application file for complete search history.

(56) References Cited

U.S. PATENT DOCUMENTS

| 9,495,251 | B2 | 11/2016 | Kottomtharayil et al. |
| 9,846,899 | B1 * | 12/2017 | Stickle ................. G06F 21/10 |
| 2009/0016534 | A1 * | 1/2009 | Ortiz Cornet ........ G06F 21/64 |
| | | | 380/277 |

(Continued)

FOREIGN PATENT DOCUMENTS

| WO | 2016090249 A1 | 6/2016 |
| WO | WO 2016/090249 | * 6/2016 |

OTHER PUBLICATIONS

Steackexchange, "Derivation of many (Key, IV) Pairs from random 128 Nonce and one secret 512 master key" Jan. 2017, pp. 1-6, https://crypto.stackexchange.com/questions/42977/derivation-of-many-key-iv-pairs-from-random-128-nonces-and-one-secret-512-mas (Year: 2017).*

(Continued)

*Primary Examiner* — Olugbenga O Idowu
(74) *Attorney, Agent, or Firm* — Fountainhead Law Group P.C.

(57) ABSTRACT

Techniques for implementing high integrity logs for distributed software services are provided. According to one set of embodiments, a key management service running on a key server can maintain a secret master key. The key management service can further generate, for each of a plurality of distributed software service instances, a service key that is unique to a current lifecycle of the software service instance, the generating being based on the master key; and transmit the service key to the software service instance, where the service key is used by the software service instance in creating a high integrity log.

18 Claims, 8 Drawing Sheets

(56) References Cited

U.S. PATENT DOCUMENTS

2011/0246767 A1* 10/2011 Chaturvedi ............. G06F 21/53
                                                    713/164
2014/0258736 A1   9/2014 Merchan et al.
2015/0264035 A1*  9/2015 Waterhouse ............ H04L 47/70
                                                    726/4
2016/0162897 A1   6/2016 Feeney
2016/0210444 A1   7/2016 Epstein et al.
2016/0275461 A1   9/2016 Sprague et al.
2017/0041296 A1   2/2017 Ford et al.

OTHER PUBLICATIONS

Deshpande, Smita, "Learn how blockchain guarantees data integrity for the Internet of Things", http://cloudblog.ericsson.com/blockchain-security-data-integrity-iot, Feb. 27, 2017, 6 pages.

"International Search Report and Written Opinion Issued in PCT Patent Application No. PCT/US18/029007", dated Jul. 24, 2018, 11 Pages.

Ray, et al., "Secure Logging as a Service Delegating Log Management to the Cloud", In Journal of IEEE systems, vol. 7, Issue 2, Jun. 1, 2013, pp. 323-334.

* cited by examiner

HIGH INTEGRITY LOGS FOR DISTRIBUTED SOFTWARE SERVICES

BACKGROUND

Many software services generate logs that record data (e.g., events, transactions, messages, errors, etc.) pertaining to their runtime operation. In a business setting, ensuring the integrity of such logs—in other words, preventing and/or detecting modifications to the logs after they are generated—can be of key importance for security analysis, regulatory compliance, and other reasons. For example, consider a scenario where an attacker compromises a server owned by an organization and the attack is not detected until some period of time later. In this case, retroactively analyzing the server's logs can, in theory, provide useful information regarding how the attack was perpetrated and the scope of the security breach. However, if the logs are not secured against tampering, the attacker can alter the logged data at the time of the attack in order to cover his/her tracks, thereby rendering the analysis invalid.

Cryptography can be a useful tool for implementing log integrity, but existing cryptographic solutions are difficult to apply to distributed software services (i.e., software services comprising multiple, separate service instances). This is because such existing solutions generally require some degree of state synchronization and state persistence across the service instances in order to keep track of common cryptographic keys and/or other security metadata. The need for state persistence also means that these existing cryptographic solutions are not robust in the face of server/network failures or service management operations (e.g., software/hardware upgrades) that may cause one or more service instances to stop and restart.

Beyond cryptography, there are other mechanisms that may be useful for promoting log integrity, such as physical or software-based access controls implemented within an organization's infrastructure. However, these other mechanisms are generally less secure than crypto-based solutions and can be difficult for third parties to audit and verify.

SUMMARY

Techniques for implementing high integrity logs for distributed software services are provided. According to one set of embodiments, a key management service running on a key server can maintain a secret master key. The key management service can further generate, for each of a plurality of distributed software service instances, a service key that is unique to a current lifecycle of the software service instance, where the generating is based on the master key; and transmit the service key to the software service instance, where the service key is used by the software service instance in creating a high integrity log.

A further understanding of the nature and advantages of the embodiments disclosed herein can be realized by reference to the remaining portions of the specification and the attached drawings.

DETAILED DESCRIPTION

Embodiments of the present disclosure provide a cryptographic framework that enables the creation of high integrity logs in a manner that is well suited to the challenges and needs of distributed software services. As used herein, a "high integrity" log is a log that can be strongly verified as being accurate (i.e., has not been altered or tampered with) via cryptographic techniques. In various embodiments, each high integrity log can be structured as a log chain, which is a chain of nodes comprising log entries (and related metadata) that are cryptographically linked to each other. The characteristics of this log chain data structure are described in further detail below.

It should be appreciated that the examples and details provided in the following description are illustrative and not intended to limit the embodiments of the present disclosure. For example, certain embodiments may be implemented without some of the described details or may be implemented with modifications or equivalents thereof.

Further, it should be noted that while the present disclosure discusses the implementation of high integrity "logs," the specific structure and content of the data payload being logged is not important for the purposes of this disclosure. Accordingly, the term "log" may be broadly construed as encompassing any type of data (in any type of format) that may be generated and stored by a software service.

1. System Environment and High-Level Flow

Figure 1:
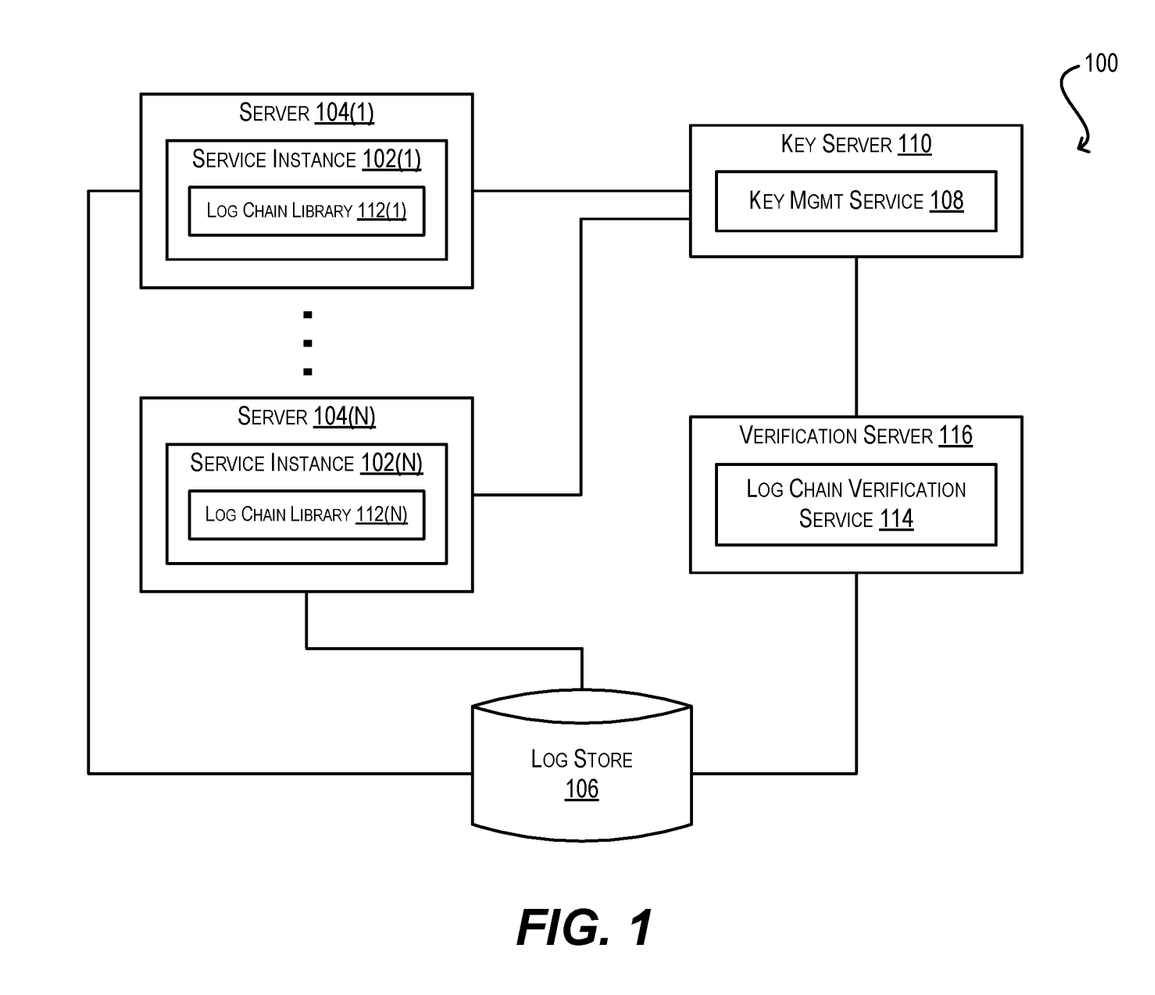
FIG. 1 depicts a simplified block diagram of a system environment according to certain embodiments.

FIG. 1 is a simplified block diagram of a system environment 100 in accordance with certain embodiments. As shown, system environment 100 includes a number of distributed software service instances 102(1)-(N) (referred to herein as simply "service instances") running on respective servers 104(1)-(N). Although each service instance 102 is depicted as running on a separate server 104, in some cases some or all of these service instances may be hosted on a single server, or on an arbitrary collection of one or more servers as is common in service-oriented architecture (SOA) deployments.

In one set of embodiments, service instances 102(1)-(N) may be instances of a single distributed software service. In another set of embodiments, service instances 102(1)-(N) may be instances of multiple distributed software services that are configured to provide different (but perhaps related or complementary) functionalities. Examples of distributed software services that may be represented by service instances 102(1)-(N) include, but are not limited to, financial payment services, network/server monitoring services, enterprise resource management services, and so on.

Service instances 102(1)-(N) are communicatively coupled with a log store 106 for the purpose of writing data (e.g., logs) pertaining to their runtime operation. For example, in a scenario where service instances 102(1)-(N) are instances of a financial payment service, each service instance 102 may be configured to write transaction data to log store 106 comprising a listing of payment transactions processed by the service instance over a current time period (e.g., last day, last week, etc.). As another example, in a scenario where service instances 102(1)-(N) are instances of a network monitoring service, each service instance 102 may be configured to write monitoring data to log store 106 comprising a recent history of network connection requests received by corresponding server 104. In various embodiments, log store 106 may be implemented as a standalone storage device/server/array as shown in FIG. 1 or may be incorporated into one or more of servers 104(1)-(N).

As noted in the Background section, it can be important for organizations that operate software services, such as enterprises, hosted service providers, and the like, to take measures that ensure the integrity of the logs generated by the services. Without such measures, the organizations may be exposed to heightened security risks and/or may be unable to meet regulatory compliance standards. However, existing cryptographic solutions for implementing log integrity suffer from a number of limitations and drawbacks, particularly in a distributed service environment as shown in FIG. 1. Examples of such limitations/drawbacks include, e.g., the need for a global state across service instances, inability to gracefully handle service instance failures/outages, and more.

To address these and other similar concerns, system environment 100 includes a key management service 108 running on a key server 110, a log chain library 112 that is a part of (or communicatively coupled with) each service instance 102(1)-(N), and a log chain verification service 114 running on a verification server 116. Although only a single instance of key management service 108 and log chain verification service 114 respectively are depicted, in other embodiments multiple instances of one or more of these services, running on the same or different key/verification servers, may be used.

Generally speaking, key management service 108, log chain libraries 112(1)-(N), and log chain verification service 114 can work in concert to enable service instances 102(1)-(N) to create high integrity logs (structured as log chains) in a manner that is efficient, robust, and scalable. For example, as shown in high-level flow diagram 200 of FIG. 2, key management service 108 can maintain a secret master key $K_m$ that it uses to generate and distribute a unique per-lifecycle service key $K_i$ to each service instance 102 at the time the service instance is started/initialized (blocks 202 and 204). This key distribution may be performed in a pull manner (i.e., in response to key requests received from service instances 102(1)-(N)) or a push manner (i.e., initiated by key management service 108). Service key $K_i$ is referred to as a unique "per-lifecycle" key because each service instance 102 can receive a brand new service key $K_i$ from key management service 108 if the service instance stops and restarts due to, e.g., a software/hardware failure or a planned service outage. As part of providing service key $K_i$ to each service instance 102, key management service 108 can also provide metadata used to derive $K_i$ from master key $K_m$.

Figure 2:
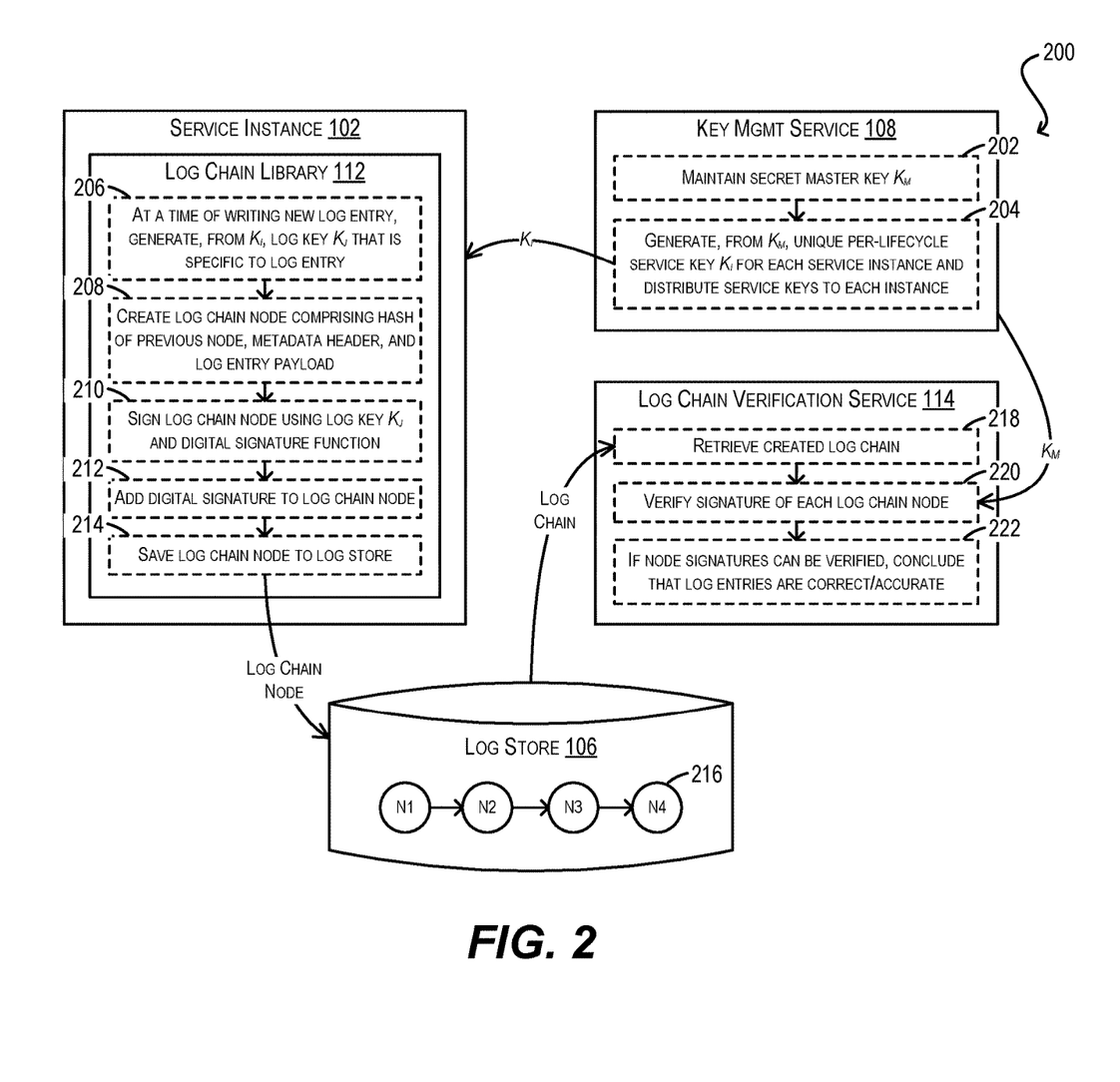
FIG. 2 depicts a flow diagram for implementing high integrity logs according to certain embodiments.

Further, at the time each service instance 102 is ready to write a new log entry, log chain library 112 of the service instance can generate, from the service instance's service key $K_i$, a log key $K_j$ that is specific to the log entry (block 206). In some embodiments, log key $K_j$ can be a private key in an asymmetric private key/public key pair. In other embodiments, log key $K_j$ can be a symmetric key. Upon deriving log key $K_j$, log chain library 112 can create a log chain node that comprises (1) a hash of the immediately previous log chain node created by service instance 102 (if it exists), (2) a metadata header including, among other things, metadata used to generate log key $K_j$ and service key $K_i$, and (3) the content (i.e., payload) of the log entry (block 208). Log chain library 112 can subsequently sign the log chain node using log key $K_j$ and an appropriate digital signature function (block 210), add the resulting digital signature to the log chain node (block 212), and save the log chain node to log store 106, thereby completing the log write operation (block 214). Although not explicitly shown, log chain library 112 can repeat these steps for additional log entries generated by service instance 102, resulting in a chain of multiple log chain nodes (e.g., log chain 216 shown in log store 106) that are cryptographically linked to each other via the previous node hash included in each node.

Yet further, at the time the log entries written by a particular service instance 102 need to be audited/verified, log chain verification service 114 can retrieve the log chain created by service instance 102 from log store 106 and verify the digital signature of each node in the log chain (blocks 218 and 220). In embodiments where the node was signed using a symmetric log key $K_j$, this can involve communicating with key management service 108 to retrieve master key $K_m$, deriving the symmetric key from master key $K_m$ (using, e.g., the key derivation metadata included in the node header), and executing a signature verification function using the symmetric key. Alternatively, log chain verification service 114 can pass the key derivation metadata to key management service 108, which can derive the symmetric key using $K_m$ and the provided metadata and return the derived symmetric key to log chain verification service 114 for signature verification. In embodiments where the node was signed using an asymmetric (private) log key $K_j$, this can involve retrieving the corresponding public key (which may be included in the node header) and executing a signature verification function using the public key. If the node signatures can be verified, log chain verification service 114 can determine that the cryptographic chain linking is intact and thus conclude with a high degree of confidence than the log entries in the log chain are correct and complete (i.e., have not been altered) (block 222).

With the high-level approach shown in FIG. 2 and described above, a number of technical advantages can be realized. First, since key management service 108 generates service keys on a per-lifecycle basis for each service instance 102 from a single master key, there is no need for each service instance to persist its service key(s) on a long-term basis (i.e., across restarts). Rather, each time a service instance 102 is initialized, it can request a new service key from key management service 108 and sign future log entries/nodes using log keys that are derived from the new service key, without regard for its previous service key. This means that this approach is robust against failures and other disruptions that may cause one or more service instances 102(1)-(N) to stop and restart. Note that any log chain nodes created by a service instance 102 using its previous service key can still be verified by log chain verification service 114 via the key derivation metadata included in the log chain nodes and the master key.

Second, since the service keys used by service instances 102(1)-(N) are separate and unique to each service instance, there is no need for service instances 102(1)-(N) to coordinate with each other in order to agree upon a converged or global state comprising common cryptographic keys or other common metadata. This significantly simplifies the implementation of the framework in large-scale distributed service deployments.

Third, as shown in flow diagram 200, the communication pattern between key management service 108 and each service instance 102 comprises a single message exchange per service instance lifecycle (i.e., the period of time spanning service instance start up/initialization to service instance termination)—the communication of the service key at the start of the lifecycle. Once each service instance 102 has its service key, it can move forward with writing its log entries/log chain nodes without communicating again with key management service 108 until the service instance is restarted. As a result, key management service 108 can scale to support a very large number of concurrent service instances.

Fourth, as mentioned previously, log chain library 112 of each service instance 102 can use either an asymmetric or symmetric log key for signing the instance's log chain nodes. This support for both asymmetric and symmetric approaches provides greater implementation flexibility and allows the service operator to choose the approach that is most appropriate for a given deployment. For example, the symmetric approach may be preferable in deployments where logging performance is a primary concern, since the computation of a digital signature using a symmetric key is generally faster than using an asymmetric key. On the other hand, the asymmetric approach may be preferable in deployments where it is undesirable for log chain verification service 114 to have access to the secret master key maintained by key management service 108, since with this approach the verification task can be performed using publically available information (i.e., the log chain node public keys).

Fifth, in some cases a service instance 102 may fail to receive a new service key from key management service 108 due to, e.g., a network outage or a key management server outage. In these cases, the service instance may continue using its existing service key which it received in its last communication with key management service 108 while it attempts to receive a new service key from key management service 108 in the background. This fallback mechanism provides survivability and robustness, since it removes a stringent availability requirement for key management server 110 and hard dependency of the service instances 102 on key management service 108.

With the foregoing in mind, the remaining sections of this disclosure present workflows that may be executed by key management service 108, each log chain library 112, and log chain verification service 114 respectively in order to implement the functionalities attributed to these components in FIG. 2. One of ordinary skill in the art will recognize that these workflows are merely examples and various modifications, variations, and alternatives are possible. For example, although not explicitly described, in certain embodiments the following workflows may make use of secure connections between the various service instances and servers, traditionally provided via security protocols such as TLS, IPsec, SSH, or others, in order to ensure the integrity and confidentiality of the network channels between these service instances/servers for transmitting keys and related metadata. It should be noted that confidentiality is generally not required for the contents of the log chains that are created; if needed, confidentiality of log contents can be implemented via traditional encryption methods with keys derived from the negotiated service keys.

2. Key Management Service Workflow

Figure 3:
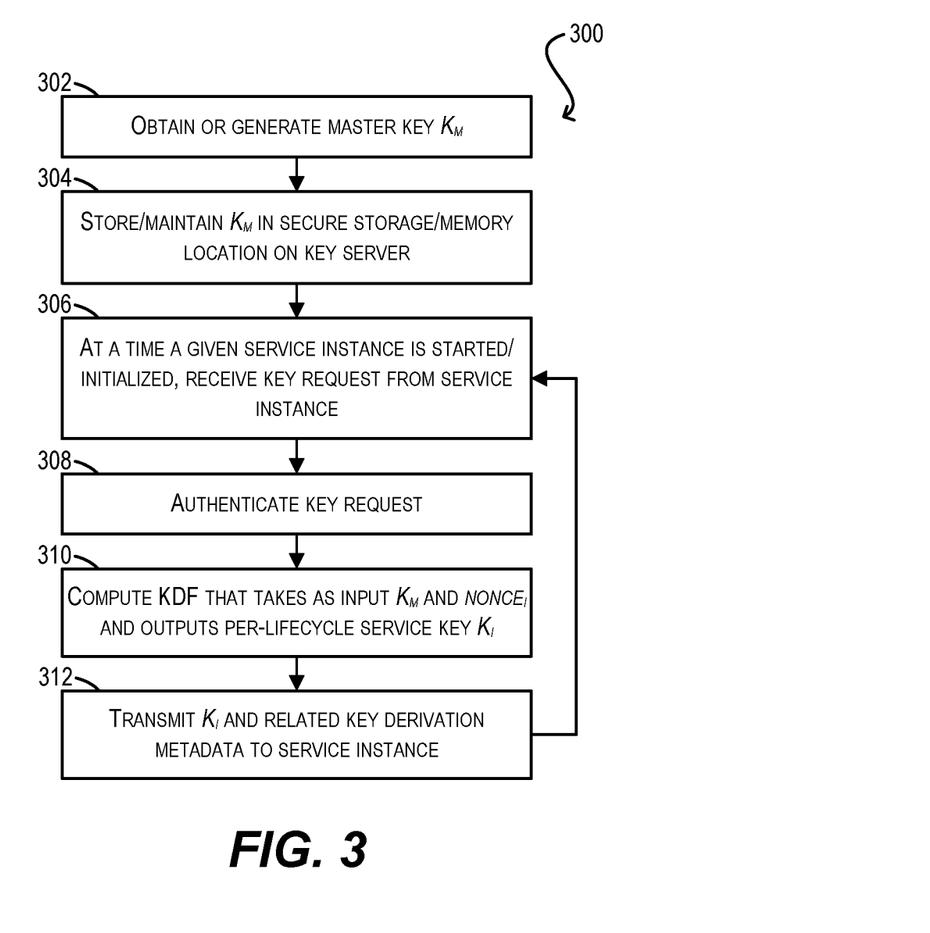
FIG. 3 depicts a workflow for generating and distributing service keys according to certain embodiments.

FIG. 3 depicts a workflow 300 that may be executed by key management service 108 for generating and distributing service keys to service instances 102(1)-(N) per blocks 202-204 of FIG. 2 in accordance with certain embodiments. Starting with block 302, key management service 108 can first obtain or generate a secret master key $K_m$ that key management service 108 will use to derive service keys for service instances 102(1)-(N). In various embodiments master key $K_m$, which is a secret string of X bits (e.g., 256 bits, 512 bits, etc.), is intended to be a long-term key and thus will generally be renewed on an infrequent basis (e.g., once a year, once every 2 years, etc.). In cases where proactive/speculative security is desired as a defense against cryptographic breaks by quantum computers, longer master keys (e.g., 512 bits or longer) may be employed with symmetric-key only cryptography. The particular time interval for performing master key renewal can be based upon various considerations, such as the computational feasibility of cracking $K_m$ via a brute force attack, the administrative overhead of performing the key renewal, the overhead of keeping track of past master keys (if needed to verify older log chains created using the past keys), and so on. In cases where key management service 108 does need to keep track of past master keys, key management service 108 can assign a version number to each stored master key and the current master key. Further, in cases where key management service 108 is implemented as a distributed service comprising multiple key management service instances, $K_m$ can be replicated on each key management service instance such that all instances maintain the same current master key.

At block 304, key management service 108 can store/maintain master key $K_m$ in a secure storage/memory location on key server 110. For example, in some embodiments, key management service 108 may store $K_m$ in a hardware-based trusted platform module (TPM) or hardware security module (HSM) of key server 110. Key management service 108 can then enter a loop in which it processes key requests from service instances 102(1)-(N).

For example, at block 306, key management service 108 can receive, at the time a particular service instance 102 is started/initialized, a key request from service instance 102 requesting a service key $K_i$. In response, key management service 108 can authenticate the request (block 308) and, assuming the authentication is successful, compute a key derivation function (KDF) that takes as input master key $K_m$ and a cryptographic nonce $nonce_i$ and outputs service key $K_i$ (block 310). The purpose of $nonce_i$ is to ensure that the generated service key is unique (i.e., has not been generated before for any other service instance), within some accepted confidence interval. To ensure this, $nonce_i$ may be a randomly generated number (e.g., a Globally Unique Identifier, or GUID), or may be a monotonically increasing counter that is incremented each time key management service 108 receives a key request.

Once service key $K_i$ has been generated, key management service 108 can transmit $K_i$, along with metadata that was used to derive $K_i$, to the requesting service instance 102 (block 312). Service instance 102 can subsequently receive and store the service key and metadata for later use at the time of writing log entries (as shown in blocks 206-214 of FIG. 2 and detailed in section (3) below). The metadata that is sent with the service key at block 312 can include $nonce_i$ and, in cases where there are multiple version of master key $K_m$, a current master key version number.

Finally, key management service 108 can return to block 306 in order to process additional key requests from other service instances 102(1)-(N), or possibly the same service instance that issued the prior request. For example, as suggested with respect to FIG. 2, in a scenario where a given service instance is stopped and restarted, the service instance may send a new key request to key management service 108 and obtain a new service key $K_i$ that is specific to the current lifecycle of the service instance. Thus, each service key $K_i$ generated by key management instance 108 is a per-lifecycle key. Significantly, in this scenario, the service instance does not need to remember its previous service key, thereby avoiding the need to maintain any persistent cryptographic state across restarts.

2.1 Workflow Optimizations/Enhancements

In some embodiments, rather than deriving service key $K_i$ directly from master key $K_m$ at block 310 of workflow 300, key management service 108 may derive service key $K_i$ from an intermediary key referred to as an epoch key $K_e$. Epoch key $K_e$ may be derived from master key $K_m$ (using e.g., a second cryptographic nonce referred to as epoch counter e) and renewed on a periodic basis, such as once a day, once a week, etc. During this time interval, all key requests received from service instances 102(1)-(N) may be processed by deriving service key $K_i$ from the same epoch key $K_e$ (rather than from master key $K_m$).

There are a number of practical advantages to this epoch-based key derivation approach. First, since the security requirements for epoch key $K_e$ (which may be renewed on a daily or weekly basis) are less stringent than the security requirements for master key $K_m$ (which will generally be renewed on a much longer timescale, such as once a year), epoch key $K_e$ can be kept in a conventional volatile memory of key server 110. This is in contrast to master key $K_m$, which will generally be stored in a more secure, but slow, storage/memory location such as a TPM. This means that key management service 108 can more quickly retrieve epoch key $K_e$ for service key derivation at the time of processing key requests.

Second, if a particular epoch key is somehow compromised, the only affected log chains will be those that were created using service keys derived during the epoch time interval covered by that epoch key. Log chains created using other service keys will remain unaffected.

Third, in certain embodiments, epoch counter e (which is incremented each time the epoch key is renewed) can be leveraged for automated master key renewal. For example, upon determining that epoch counter e has reached or exceeded some preconfigured threshold, key management service 108 can automatically renew master key $K_m$. This avoids the need for a service administrator to remember the schedule for renewing $K_m$ and manually carrying out the renewal task, thereby reducing the management burden on the administrator.

In cases where the epoch-based key derivation approach is used, key management service 108 can include epoch counter e in the key derivation metadata that is sent with service key $K_i$ at block 312. This will allow log chain verification service 114 to derive $K_e$ at the time of log chain verification.

3. Log Chain Library Workflow (Log Chain Node Creation)

Figure 4:
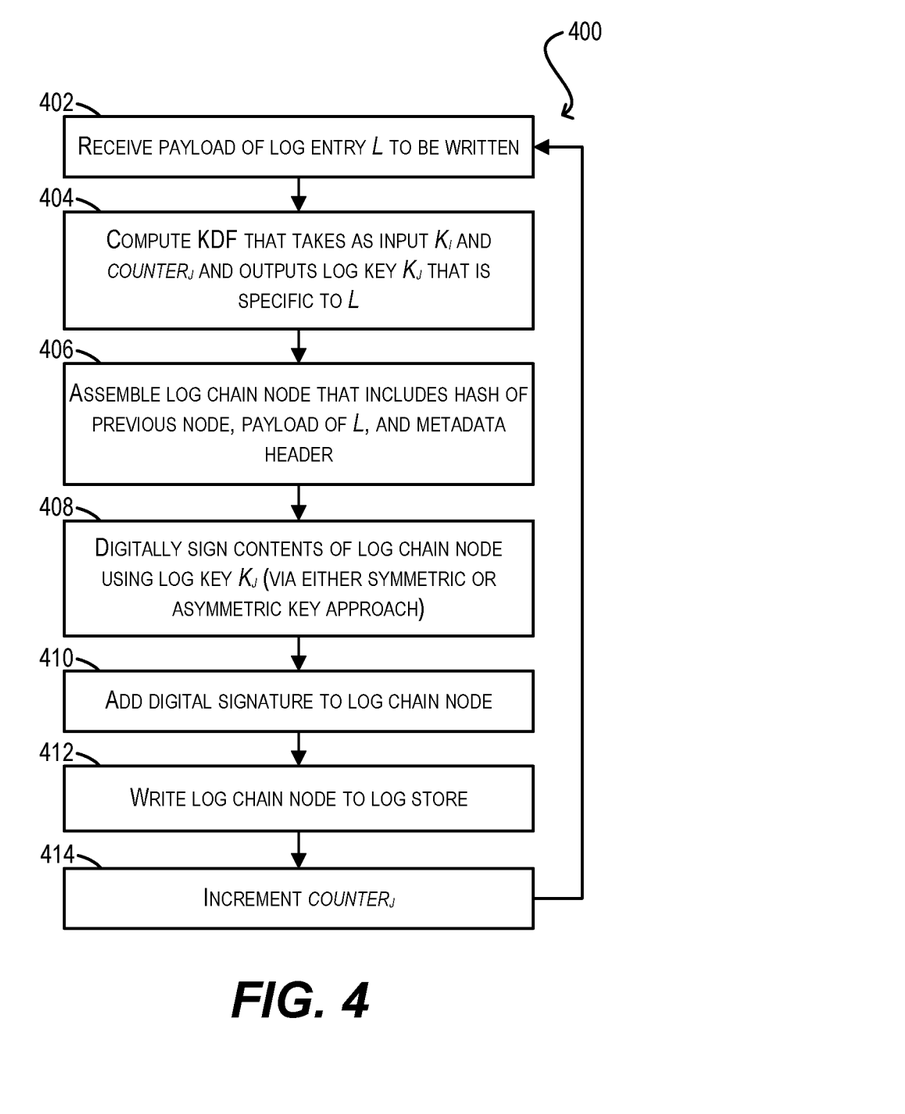
FIG. 4 depicts a workflow for creating log chain nodes according to certain embodiments.

FIG. 4 depicts a workflow 400 that may be executed by log chain library 112 of each service instance 102 for writing log entries/log chain nodes to log store 106 per blocks 206-214 of FIG. 2 according to certain embodiments. Workflow 400 assumes that service instance 102 has received, for its current lifecycle, a service key $K_i$ and related key derivation metadata (e.g., $nonce_i$, master key version (if applicable), and epoch counter e (if applicable)) from key management service 108 as described in the foregoing section.

Starting with block 402, log chain library 112 can be invoked by service instance 102 at a time service instance 102 is ready to write a new log entry L to log store 106. As part of this invocation, log chain library 112 can receive the content (i.e., payload) of log entry L.

At block 404, log chain library 112 can compute a KDF that takes as input service key $K_i$ and a cryptographic nonce $counter_j$ and outputs a log key $K_j$ that is specific to log entry L. $Counter_j$, which is distinct from $nonce_i$ mentioned previously, is used to ensure that the generated log key is unique for log entry L (i.e., has not been generated before for any other log entry), within some accepted confidence interval. As indicated by its name, $counter_j$ can be a monotonically increasing counter that is incremented by log chain library 112 each time a new log entry is written (and thus, each time a new log chain node is created). In some embodiments, $counter_j$ may be initialized at zero each time service instance 102 is restarted.

Once log key $K_j$ has been derived from service key $K_i$, log chain library 112 can assemble a log chain node that includes a hash of the previous log chain node created by library 112 (if such a previous log chain node exists), the payload of log entry L, and a metadata header (block 406). In one set of embodiments, this metadata header can include the following information:

Master key version (if applicable)
Epoch counter e (if applicable)
$Nonce_i$
$Counter_j$
Service instance identifier (identifying service instance 102)

Log chain library 112 can then digitally sign the contents of the log chain node (e.g., the hash, the log payload, and the metadata header) using log key $K_j$ and add the resulting digital signature to the log chain node (blocks 408 and 410). As discussed with respect to FIG. 2, this signing step can be performed using either a symmetric key approach or an asymmetric key approach. With the symmetric key approach, log chain library 112 can input log key $K_j$ and the contents of the log chain node to, e.g., a message authentication code (MAC)-based digital signature algorithm $A_{mac}$ in order to generate the node signature. In this case, at the time of verifying the integrity of the log chain node, log chain verification service 114 will generally need to provide the key derivation metadata included in the node header to key management service 108 (or a separate "oracle" with access to secret master key $K_m$), which in turn can derive the log key from the metadata and $K_m$ and return the log key to log chain verification service 114 for signature verification.

With the asymmetric key approach, log chain library 112 can derive log key $K_j$ as a private key in a private key/public key pair. For example, in one set of embodiments, log chain library 112 can derive log key $K_j$ as an elliptical curve cryptography (ECC) private key with a corresponding ECC public key $K_{pub}$. Log chain library 112 can then input the private log key $K_j$ and the contents of the log chain node to an asymmetric digital signature algorithm $A_{sig}$ in order to generate the node signature. Log chain library 112 can also add the corresponding public key $K_{pub}$ to the metadata header of the log chain node. In this case, at the time of verifying the integrity of the log chain node, log chain verification service 114 advantageously does not need to access key management service 108 or a separate oracle, since service 114 can validate the node signature using publically available public key $K_{pub}$. However, this approach will generally be slower than the symmetric key approach when signing log chain nodes.

At block 412, log chain library 112 can write the digitally signed log chain node to log store 106, thereby adding the node to service instance 102's current log chain. Note that the particular manner in which one log chain node points to another within log store 106 can differ depending on the data construct(s) used to store the nodes in log store 106 (e.g., linked list, database table, etc.). In addition, at block 414, log chain library 112 can increment counter$_j$.

Finally, log chain library 112 can return to block 402 in order to process additional log entries, and this loop can repeat until service instance 102 is shut down. It should be noted that each time service instance 102 is stopped and subsequently restarted, log chain library 112 will start a new log chain that is not linked to the instance's previously created log chain (due to the use of a new service key $K_i$). This will cause service instance 102 to generate multiple separate log chains in log store 106 over time. If these separate log chains are deemed to be problematic or undesirable, a "log stitching" task may be used to combine the multiple log chains of a single service instance into a single, long log chain. The implementation details for this log stitching task are described in section (5) below.

3.1 Workflow Optimizations/Enhancements

In some embodiments, rather than including service key-related metadata parameters [master key version, epoch counter e, nonce$_i$] in the metadata header of each log chain node, log chain library 112 can include these parameters solely in an initial log chain node that is created at the time of service initialization. In these embodiments, the initial log chain node can be considered a "configuration" node because it will not include a log payload; instead, its sole purpose is to record the service key-related metadata parameters so that these parameters do not need to be repeated in subsequent nodes of the same log chain. In scenarios where service instance 102 generates an extremely high volume of log entries, this optimization can save a significant amount of storage space on log store 106.

In further embodiments, for purposes of crypto-agility, log chain library 112 can include in the header of each log chain node (other than the initial configuration node): (1) an identifier of the KDF used at block 404 to derive log key $K_j$ from service key $K_i$ (i.e., $A_{kdf}$), and (2) an identifier of the MAC signature function or asymmetric signature function used at block 408 to digitally sign the log chain node (i.e., $A_{mac}$ or $A_{sig}$). With this enhancement, $A_{kdf}$, $A_{mac}$, and $A_{sig}$ can be flexibly changed on an as-needed basis (for example, in response to potential security concerns or other factors), and at the same time log chain verification service 114 will know exactly how to re-derive log key $K_j$ and verify the node signature based on the inclusion of these parameters in the node header.

4. Log Chain Verification Service Workflows

Figure 5:
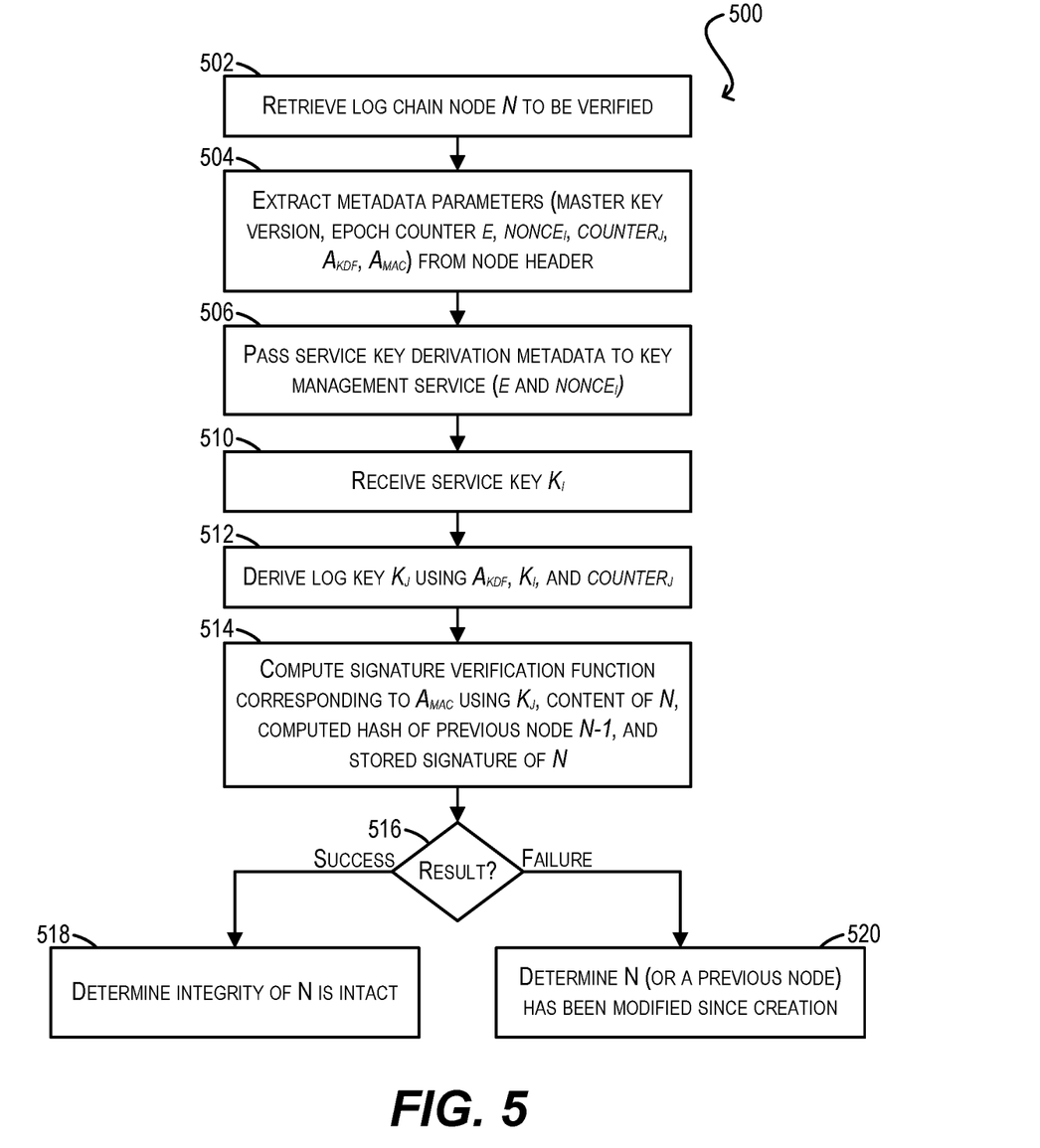
FIGS. 5 and 6 depict workflows for verifying the integrity of a log chain according to certain embodiments.
Figure 6:
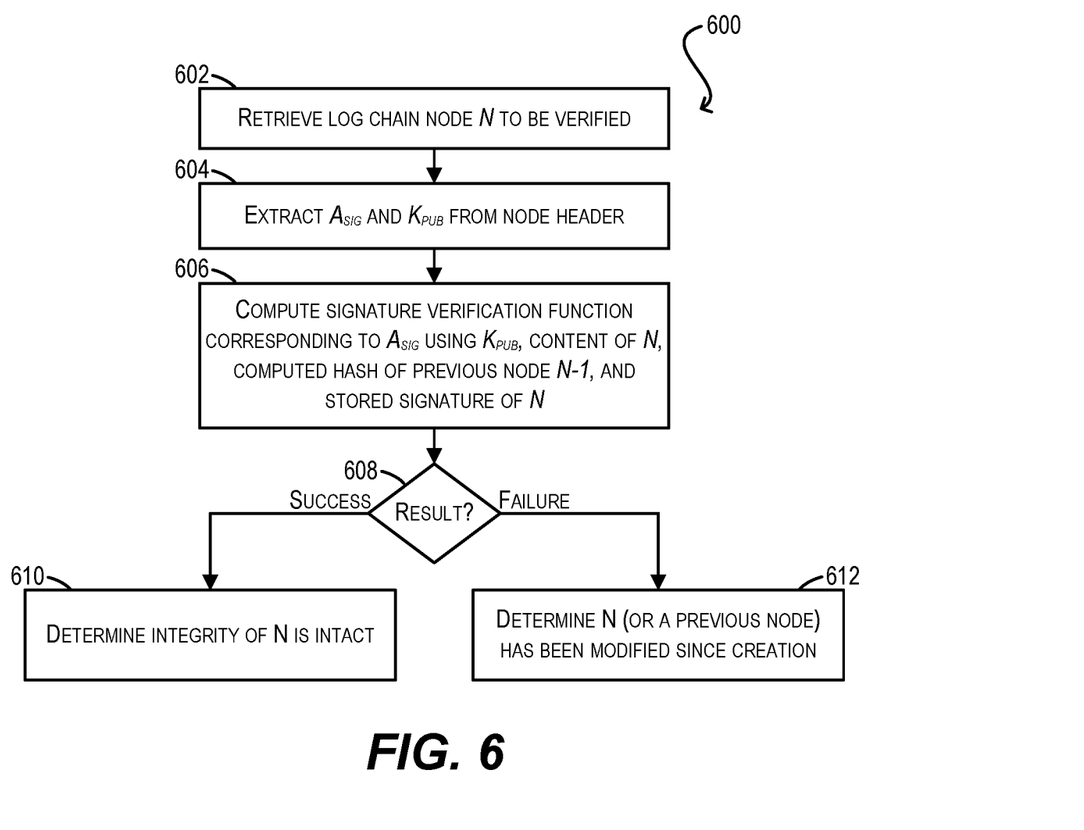

FIGS. 5 and 6 depict two workflows 500 and 600 that may be executed by log chain verification service 114 for verifying the integrity of a log chain per blocks 218-222 of FIG. 2 according to certain embodiments. Log chain verification service 114 may execute workflow 500 in embodiments where the log chain nodes are signed via the symmetric key approach described above, and may execute workflow 600 in embodiments where the log chain nodes are signed via the asymmetric key approach described above. Note that workflows 500 and 600 illustrate the process of verifying a single log chain node; accordingly, these workflows should be repeated on each node in a log chain (e.g., from first to last) in order to verify the integrity of the entire log chain.

Starting with block 502 of workflow 500, log chain verification service 114 can retrieve the log chain node to be verified (i.e., node N) from log store 106. Upon retrieving node N, log chain verification service 114 can extract the various metadata parameters included in the node header (e.g., master key version, epoch counter e, nonce$_i$, counter$_j$, $A_{kdf}$, $A_{mac}$) (block 504). In embodiments where the service-key related parameters are placed in an initial configuration node rather than present node N, log chain verification service 114 can traverse to that initial node and extract these parameters from the initial node as part of block 504.

At block 506, log chain verification service 114 can invoke an interface exposed by key management service 108 (or an oracle) that takes as input service key-related metadata (e.g., epoch counter e and nonce$_i$), derives service key $K_i$ based on master key $K_m$ and the provided metadata, and returns the service key to log chain verification service 114 (block 510). Log chain verification service 114 can then derive log key $K_j$ using service key $K_i$, counter$_j$, and $A_{kdf}$ (block 512), and compute a signature verification function corresponding to $A_{mac}$ using log key $K_j$, the content of node N, a computed hash of prior node N−1, and the stored signature of node N (block 514). If the signature verification function returns a successful result, log chain verification service 114 can determine that the integrity of node N is intact (blocks 516 and 518). On the other hand, if the signature verification function returns a failure result, log chain verification service 114 can determine that node N (or a prior node in the log chain) has been altered since its creation (blocks 516 and 520).

Turning now to block 602 of workflow 600, log chain verification service 114 can retrieve the log chain node to be verified (i.e., node N) from log store 106. Upon retrieving node N, log chain verification service 114 can extract $A_{sig}$ and $K_{pub}$ from the node's metadata header (block 604). Log chain verification service 114 then compute a signature verification function corresponding to $A_{sig}$ using public key $K_{pub}$, the content of node N, a computed hash of prior node N−1, and the stored signature of node N (block 606). If the signature verification function returns a successful result, log chain verification service 114 can determine that the integrity of node N is intact (blocks 608 and 610). On the other hand, if the signature verification function returns a failure result, log chain verification service 114 can determine that node N (or a prior node in the log chain) has been altered since its creation (blocks 608 and 612).

It should be noted that, with verification workflow 600 of FIG. 6, log chain verification service 114 assumes the first public key $K_{pub}$ included in the first node of the log chain has not been forged. If the first public key in in the log chain is forged, all subsequent nodes (which are cryptographically linked to the first node) can be forged. One way for log chain verification service 114 to establish the authenticity of this first public key is for key management service 108 (rather than log chain library 112) to generate the first public key for a service instance 102 at the time of deriving the instance's service key and providing this public key, along with a public key certificate, to service instance 102. Service instance can include this key management service-generated public key and public key certificate in the first (i.e., configuration) node of the log chain. Then, at the time of verifying the log chain, log chain verification service 114 can retrieve the public key and corresponding certificate from the configuration node and verify that this key is owned by key management service 108. If this verification is successful, log chain verification service 114 can conclude that the public key is authentic and proceed with its log chain verification processing.

5. Log Chain Stitching Workflow

Figure 7:
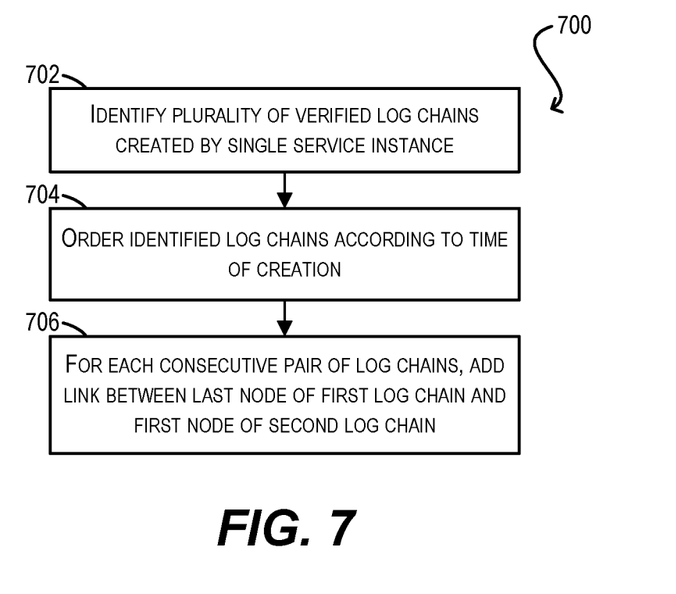
FIG. 7 depicts a workflow for performing log chain stitching according to certain embodiments.

As mentioned in section (3) above, in scenarios where a service instance 102 is stopped and restarted, service instance 102 will obtain a new service key $K_i$ from key management service 108 and begin creating a new log chain that is not explicitly linked to the previous log chain(s)

created by service instance 102 prior to the restart. In some cases, it may be useful to combine these separate log chains into a single long log chain (for, e.g., reporting or other purposes). To address this need, a log stitching task may be implemented on, e.g., log chain verification service 114 (or some other service in system environment 100) that can stitch together the verified log chains for a single service instance. FIG. 7 depicts a workflow 700 that may be executed by the log stitching task to provide this functionality according to certain embodiments.

At block 702, the log stitching task can first identify a plurality of verified log chains that are related to each other (i.e., were generated by the same service instance 102) by looking at the service instance identifiers included in the log chain node headers.

At block 704, the log chain stitching task can order the identified log chains in terms of when they were created. In one set of embodiments, this ordering step can be performed by sorting the log chains based on timestamps that may be included the log payloads. In another set of embodiments, this ordering step can be performed by sorting the log chains based on epoch counter e and $nonce_i$ included in the node headers (this approach assumes that $nonce_i$ is an increasing counter).

Once the log chains have been temporally ordered, the log stitching task can, for each consecutive pair of log chains, add a link between the last node in the first log chain of the pair to the first node in the second log chain of the pair, thereby stitching them together (block 706). As part of this, in certain embodiments the log stitching task can use the log key of the last node in the first log chain to sign the contents of the first node in the second log chain.

6. Example Computer System

Figure 8:
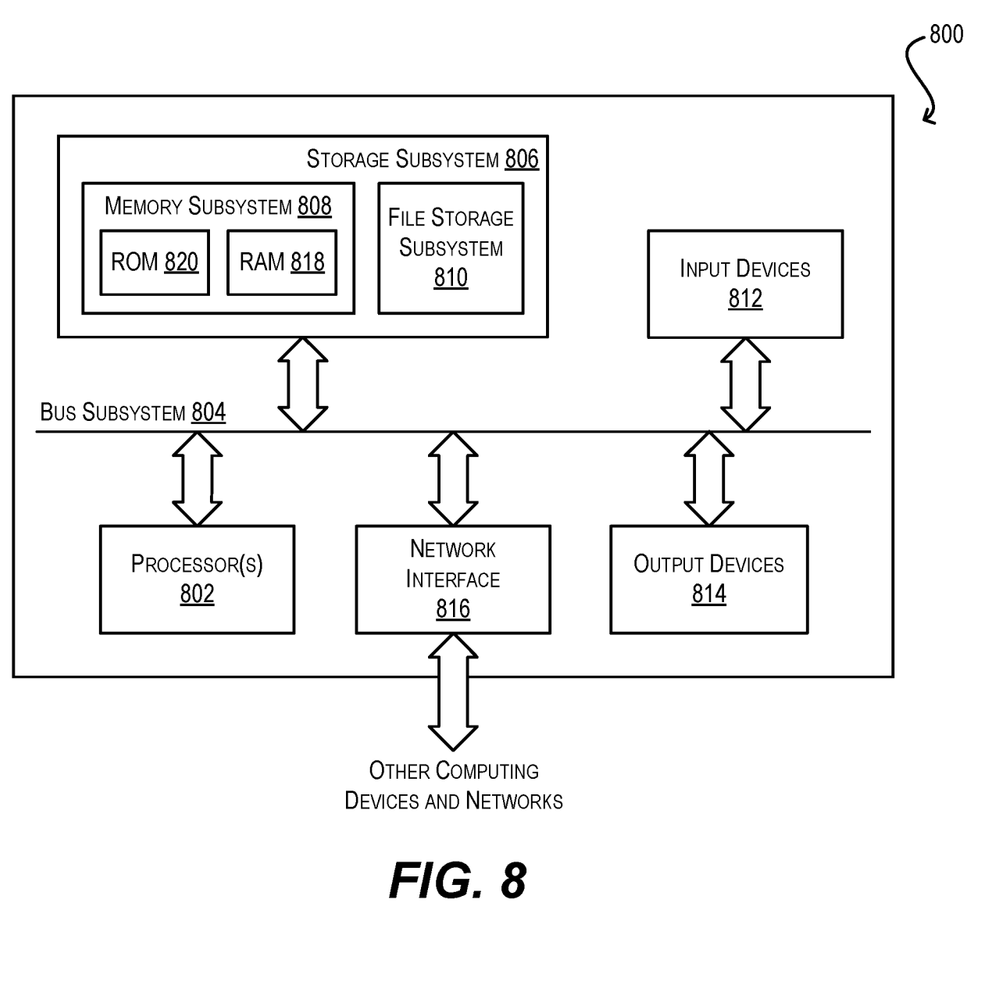
FIG. 8 depicts a simplified block diagram of an example computer system according to certain embodiments.

FIG. 8 depicts a simplified block diagram of an example computer system 800 according to certain embodiments. Computer system 800 can be used to implement any of the computing devices, systems, or servers described in the foregoing disclosure, such as servers 104(1)-(N), key server 110, and verification server 116 of FIG. 1. As shown in FIG. 8, computer system 800 includes one or more processors 802 that communicate with a number of peripheral devices via a bus subsystem 804. These peripheral devices include a storage subsystem 806 (comprising a memory subsystem 808 and a file storage subsystem 810), user interface input devices 812, user interface output devices 814, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., an Ethernet card, a Wi-Fi and/or cellular adapter, a modem (telephone, satellite, cable, ISDN, etc.), digital subscriber line (DSL) units, and/or the like.

User interface input devices 812 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 800.

Storage subsystem 806 includes a memory subsystem 808 and a file/disk storage subsystem 810. Subsystems 808 and 810 represent non-transitory computer-readable storage media that can store program code and/or data that provide the functionality of embodiments of the present disclosure.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   a processor; and
   a non-transitory computer readable storage medium having stored thereon program code that, when executed by the processor, causes the processor to:
   maintain, in a secure storage or memory location of the computer system, a master key; and
   for each software service instance in a plurality of distributed software service instances that are communicatively coupled with the computer system:

generate a service key that is unique to a current lifecycle of the software service instance, the generating being based on the master key and comprising:
computing a first key derivation function that takes as input the master key and a first cryptographic nonce, the computing of the first key derivation function resulting in an intermediary key; and
computing a second key derivation function that takes as input the intermediary key and a second cryptographic nonce, the computing of the second key derivation function resulting in the service key; and
transmit the service key to the software service instance, wherein the service key is used by the software service instance in creating a high integrity log.

2. The computer system of claim 1 wherein the high integrity log is structured as a log chain comprising a plurality of log chain nodes, and wherein each log chain node other than a first log chain node in the log chain includes a payload of a log entry generated by the software service instance and a hash of a previous log chain node in the log chain.

3. The computer system of claim 1 wherein the processor generates the service key in response to a key request received from the software service instance at a time the software service instance is initialized.

4. The computer system of claim 1 wherein the second cryptographic nonce is a random number or a monotonically increasing counter that is incremented for each generated service key.

5. The computer system of claim 1 wherein the first cryptographic nonce is transmitted with the service key to the software service instance.

6. The computer system of claim 5 wherein upon receiving the service key, the software service instance is configured to, at a time of writing a new log entry:
generate a log key that is specific to the new log entry, the generating being based on the service key;
create a log chain node comprising a payload of the new log entry, a hash of a previous log chain node created by the software service instance, and a header that includes the first cryptographic nonce;
digitally sign the log chain node using the log key to generate a node signature;
add the node signature to the log chain node; and
save the log chain node to a log store.

7. The computer system of claim 6 wherein the software service instance generates the log key by computing a third key derivation function that takes as input the service key and a third cryptographic nonce.

8. The computer system of claim 7 wherein the third cryptographic nonce is a monotonically increasing counter that is incremented each time the software service instance generates a new log entry.

9. The computer system of claim 6 wherein the log key is a symmetric key, and wherein digitally signing the log chain node comprises computing a message authentication code (MAC) signature function that takes as input the symmetric key.

10. The computer system of claim 9 wherein an identifier of the MAC signature function is included in the header of the log chain node.

11. The computer system of claim 9 wherein a log chain verification service is configured to verify integrity of the log chain node by:
invoking an interface exposed by the computer system for deriving the service key from the master key;
deriving the log key from the service key; and
computing a signature verification function that takes as input the log key.

12. The computer system of claim 6 wherein the log key is a private key in an asymmetric public key and private key pair, and wherein digitally signing the log chain node comprises computing a signature function that takes as input the private key.

13. The computer system of claim 12 wherein the public key and an identifier of the signature function are included in the header of the log chain node.

14. The computer system of claim 13 wherein a log chain verification service is configured to verify integrity of the log chain node by:
retrieving the public key from the header of the log chain node; and
computing a signature verification function that takes as input the public key.

15. A method comprising:
maintaining, by a key management service running on a key server, a master key; and
for each software service instance in a plurality of distributed software service instances:
generating, by the key management service, a service key that is unique to a current lifecycle of the software service instance, the generating being based on the master key and comprising:
computing a first key derivation function that takes as input the master key and a first cryptographic nonce, the computing of the first key derivation function resulting in an intermediary key; and
computing a second key derivation function that takes as input the intermediary key and a second cryptographic nonce, the computing of the second key derivation function resulting in the service key; and
transmitting, by the key management service, the service key to the software service instance, wherein the service key is used by the software service instance in creating a high integrity log.

16. The method of claim 15 wherein the high integrity log is structured as a log chain comprising a plurality of log chain nodes, and wherein each log chain node other than a first log chain node in the log chain includes a payload of a log entry generated by the software service instance and a hash of a previous log chain node in the log chain.

17. A non-transitory computer readable storage medium having stored thereon program code executable by a computer system, the program code causing the computer system to:
maintain, in a secure storage or memory location of the computer system, a master key; and
for each software service instance in a plurality of distributed software service instances that are communicatively coupled with the computer system:
generate a service key that is unique to a current lifecycle of the software service instance, the generating being based on the master key and comprising:
computing a first key derivation function that takes as input the master key and a first cryptographic nonce, the computing of the first key derivation function resulting in an intermediary key; and computing a second key derivation function that takes as input the intermediary key and a second cryptographic nonce, the computing of the second key derivation function resulting in the service key; and transmit the service key to the software service instance, wherein the service key is used by the software service instance in creating a high integrity log.

18. The non-transitory computer readable storage medium of claim 17 wherein the high integrity log is structured as a log chain comprising a plurality of log chain nodes, and wherein each log chain node other than a first log chain node in the log chain includes a payload of a log entry generated by the software service instance and a hash of a previous log chain node in the log chain.

\* \* \* \* \*